United States Patent
Wang et al.

(10) Patent No.: US 9,306,388 B2
(45) Date of Patent: Apr. 5, 2016

(54) CURRENT-LIMITING CIRCUIT AND APPARATUS

(71) Applicant: HUAWEI TECHNOLOGIES CO., LTD., Shenzhen, Guangdong (CN)

(72) Inventors: Jianping Wang, Chengdu (CN); Yang Yang, Chengdu (CN); Pengfei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 14/446,015

(22) Filed: Jul. 29, 2014

(65) Prior Publication Data

US 2015/0055264 A1    Feb. 26, 2015

(30) Foreign Application Priority Data

Aug. 22, 2013   (CN) .......................... 2013 1 0369590

(51) Int. Cl.
  *H02H 7/00*  (2006.01)
  *H02H 9/02*  (2006.01)
(52) U.S. Cl.
  CPC .................................... *H02H 9/025* (2013.01)
(58) Field of Classification Search
  CPC ..................................................... H02H 9/025
  USPC ....................................................... 361/93.9
  See application file for complete search history.

(56) References Cited

U.S. PATENT DOCUMENTS

| 3,984,755 | A | * | 10/1976 | Lehnhoff | .................. H02H 7/06 322/28 |
| 4,075,546 | A | * | 2/1978 | Barber | .................... G05F 1/618 323/224 |
| 6,166,530 | A | | 12/2000 | D Angelo | |
| 7,015,680 | B2 | * | 3/2006 | Moraveji | ................ G05F 1/565 323/274 |
| 7,304,462 | B2 | * | 12/2007 | Shvarts | .................... H02J 1/10 323/272 |
| 7,728,655 | B2 | | 6/2010 | Ng et al. | |
| 2002/0033727 | A1 | | 3/2002 | Okamoto | |
| 2008/0204958 | A1 | | 8/2008 | Shearon et al. | |
| 2009/0059454 | A1 | | 3/2009 | Chu | |

FOREIGN PATENT DOCUMENTS

| CN | 1398454 A | 2/2003 |
| CN | 102591832 A | 7/2012 |
| EP | 0733960 A2 | 9/1996 |

* cited by examiner

*Primary Examiner* — Stephen W Jackson
(74) *Attorney, Agent, or Firm* — Huawei Technologies Co., Ltd.

(57) ABSTRACT

Embodiments of the present invention relate to the field of electronic technologies, and provide a current-limiting circuit and apparatus to reduce costs of the current-limiting circuit and an occupied PCB board area. The circuit comprises a detecting resistor, a current-limiting resistor, a precise current unit, a power metal oxide MOS transistor, an operational amplifier OP and an input voltage end.

18 Claims, 3 Drawing Sheets

CURRENT-LIMITING CIRCUIT AND APPARATUS

CROSS-REFERENCE TO RELATED APPLICATION

This application claims priority to Chinese Patent Application No. 201310369590.0, filed on Aug. 22, 2013, which is hereby incorporated by reference in its entirety.

TECHNICAL FIELD

The present invention relates to the field of electronic technologies, and in particular, to a current-limiting circuit and apparatus.

BACKGROUND

The development of the USB (Universal Serial BUS, universal serial bus) technology makes connections and communication between various external devices and computers become very convenient and fast. A common plug-and-play device needs an active USB interface to perform data transmission and supply power. In order to prevent a connection failure or a burned USB port due to an external device extracting excessive currents from the USB, a maximum current extracted from the USB port needs to be limited. Therefore, a current-limiting circuit needs to be integrated in a terminal device.

In the prior art, as shown in FIG. 1, a mainstream current-limiting circuit includes: an input voltage end, a precise current detecting resistor with a low resistance value, a VREF (voltage reference) module with an internal relative input voltage, a P-type MOS (Metal-Oxide-Semiconductor, metal oxide semiconductor) transistor, an output voltage end, an output capacitor, and an OP (Operational Amplifier, operational amplifier) with a low offset voltage. One end of the precise current detecting resistor with a low resistance value is connected to the VREF module and the input voltage end, and the other end thereof is connected to an inverting input end of the OP. One end of the VREF module is connected to one end of the precise current detecting resistor with a low resistance value, and the other end thereof is connected to a non-inverting input end of the OP. A gate electrode of the P-type MOS transistor is connected to an output end of the OP, a drain electrode is connected to the other end of the precise current detecting resistor with a low resistance value, and a source electrode is connected to the output capacitor and the output voltage end. As detecting resistors are connected in series in a current loop, a resistance value is generally 10 mohm-100 mohm.

The current-limiting circuit needs at least one external precise current detecting resistor with a low resistance value, and a range of the resistance value is 10 mohm-100 mohm for efficiency purposes. This type of detecting resistors is relatively large in size and high in price, and occupies a large PCB (Printed Circuit Board, printed circuit board) area, thereby increasing costs of the current-limiting circuit.

SUMMARY

Embodiments of the present invention provide a current-limiting circuit and apparatus to reduce costs of the current-limiting circuit and reduce an occupied PCB board area.

In order to achieve the foregoing objectives, the embodiments of the present invention use the following technical solutions.

In a first aspect, an embodiment of the present invention provides a current-limiting circuit, which includes a detecting resistor, a current-limiting resistor, a precise current unit, a power metal oxide semiconductor MOS transistor, an operational amplifier OP, and an input voltage end, where the OP includes a non-inverting input end, an inverting input end, and an output end; the input voltage end is configured to receive an input voltage; one end of the detecting resistor is connected to the input voltage end, and the other end thereof is connected to the non-inverting input end of the OP; the detecting resistor is provided with at least one resistance value, and a resistance value of the detecting resistor may be adjusted to one resistance value among the at least one resistance value; one end of the current-limiting resistor is connected to the input voltage end, and the other end thereof is connected to the inverting input end of the OP; the precise current unit is connected to the other end of the detecting resistor and is configured to adjust a proportional error between the current-limiting resistor and the detecting resistor by outputting a precise reference current; and the power MOS transistor includes a gate electrode, a source electrode and a drain electrode, where the gate electrode is connected to the output end of the OP; the source electrode is connected to the other end of the current-limiting resistor; and the drain electrode outputs a current-limiting current corresponding to one resistance value.

In a first possible implementation of the first aspect, the detecting resistor and the current-limiting resistor are of a same type.

With reference to the first aspect or the first possible implementation of the first aspect, in a second possible implementation of the first aspect, the current-limiting circuit further includes a first resistor, a second resistor, a first current source, and a second current source, where the other end of the detecting resistor is connected to the non-inverting input end of the OP through the first resistor; the other end of the current-limiting resistor is connected to the inverting input end of the OP through the second resistor; the first current source is coupled between the first resistor and the non-inverting input end of the OP and is configured to calibrate an offset voltage of the OP when the offset voltage between a voltage of the non-inverting input end of the OP and a voltage of the inverting input end of the OP is greater than 0; and the second current source is coupled between the second resistor and the inverting input end of the OP and is configured to calibrate the offset voltage of the OP when the offset voltage between a voltage of the non-inverting input end of the OP and a voltage of the inverting input end of the OP is less than 0.

With reference to the second possible implementation of the first aspect, in a third possible implementation of the first aspect, the first resistor and the second resistor are resistors of a same type.

With reference to the second or the third possible implementation of the first aspect, in a fourth possible implementation of the first aspect, resistance values of the first resistor and the second resistor are equal.

With reference to any one of the second to the fourth possible implementations of the first aspect, in a fifth implementation of the first aspect, an initial value of a current input by the first current source to the first resistor is 0 milliampere; and an initial value of a current input by the second current source to the second resistor is 0 milliampere.

With reference to any one of the second to the fourth possible implementations of the first aspect, in a sixth possible implementation of the first aspect, an initial value of a current input by the first current source to the first resistor is not 0 milliampere; an initial value of a current input by the second current source to the second resistor is not 0 milliampere; and the current input by the first current source to the first resistor is equal to the current input by the second current source to the second resistor.

With reference to any one of the second to the sixth possible implementations of the first aspect, in a seventh possible implementation of the first aspect, the first resistor, the second resistor, the detecting resistor and the current-limiting resistor are resistors of a same type.

With reference to the first aspect or any one of the first to the seventh possible implementations of the first aspect, in an eighth possible implementation of the first aspect, the power MOS transistor includes a P-type power MOS transistor.

In a second aspect, an embodiment of the present invention provides a current-limiting apparatus, which includes a processing unit and a current-limiting circuit, where the processing unit is configured to adjust a resistance value of the detecting resistor to one resistance value among the at least one resistance value; and the current-limiting circuit is the current-limiting circuit of the foregoing embodiment.

The embodiments of the present invention provide a current-limiting circuit and apparatus. The current-limiting circuit includes a detecting resistor, a current-limiting resistor, a precise current unit, a power MOS transistor, an operational amplifier OP, and an input voltage end. In this way, no external resistor is added to facilitate the current-limiting circuit in the embodiments of the present invention, and corresponding high-precision current-limiting currents are generated by internal units of the circuit, thereby reducing costs of the current-limiting circuit and reducing occupied PCB board area.

BRIEF DESCRIPTION OF DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
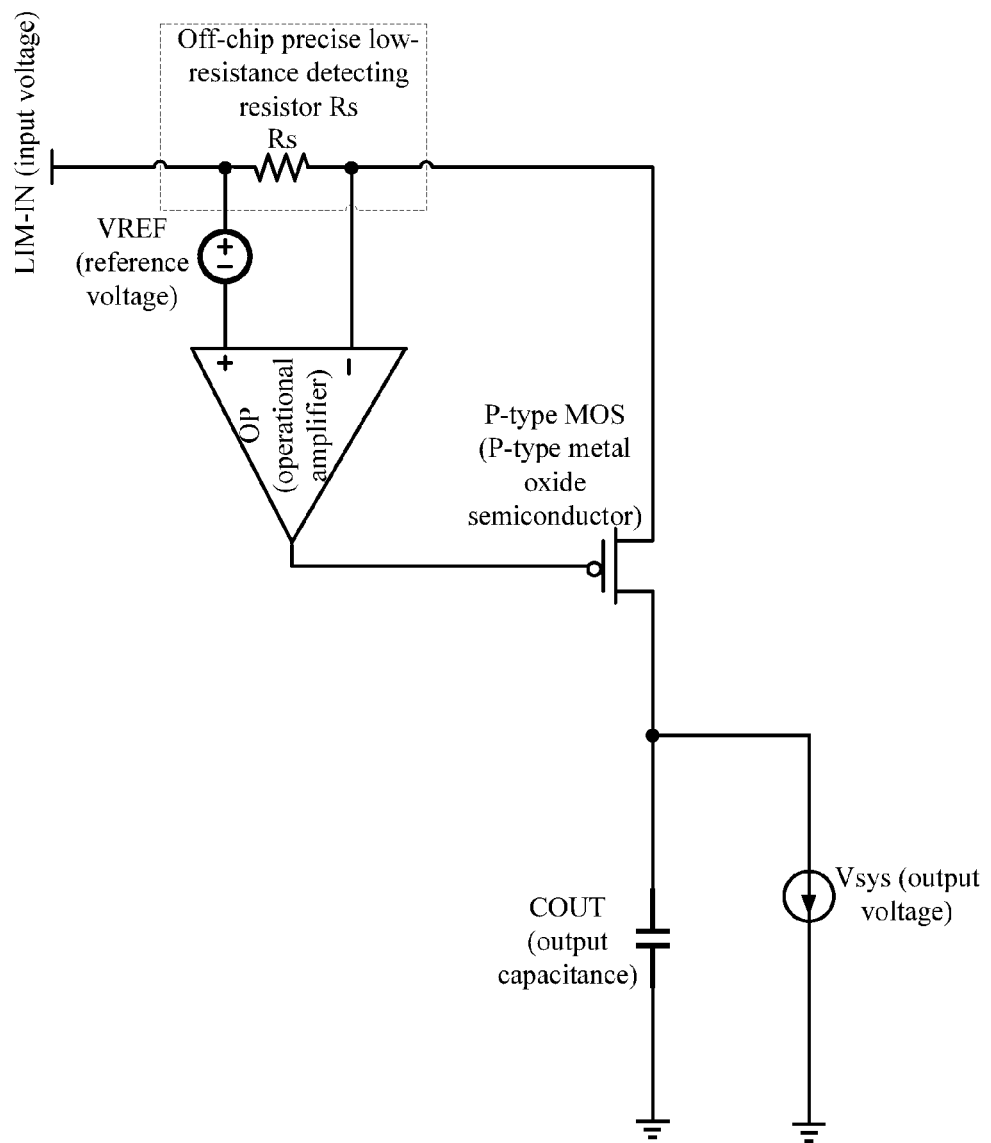
FIG. 1 is a schematic structural diagram of a current-limiting circuit in the prior art.
Figure 2:
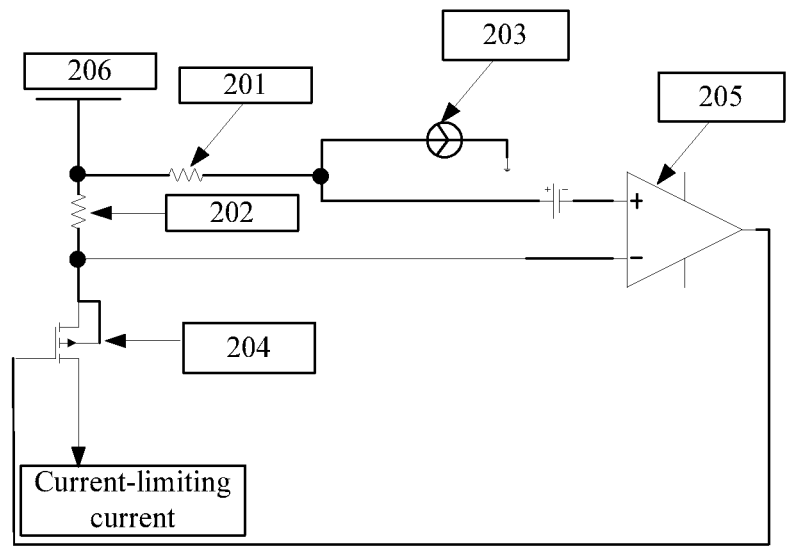
FIG. 2 is a schematic structural diagram of a current-limiting circuit according to an embodiment of the present invention.

An embodiment of the present invention provides a current-limiting circuit. As shown in FIG. 2, the current-limiting circuit includes a detecting resistor 201, a current-limiting resistor 202, a precise current unit 203, a power MOS (Metal-Oxide-Semiconductor, metal oxide semiconductor) transistor 204, an OP (Operational Amplifier, operational amplifier) 205, and an input voltage end 206.

The OP 205 includes a non-inverting input end, an inverting input end, and an output end.

One end of the detecting resistor 201 is connected to the input voltage end 206, and the other end thereof is connected to the non-inverting input end of the OP 205; and the detecting resistor 201 is provided with at least one resistance value, and a resistance value of the detecting resistor may be adjusted to one resistance value among the at least one resistance value.

It should be noted that various connections involved in the embodiments of the present invention may be direct connections or indirect connections between components and devices, and include couplings between different devices through a third-party component. For example, in FIG. 2, the detecting resistor 201 and the input voltage end 206 are connected through a capacitor.

Specifically, the detecting resistor 201 may be set to a plurality of resistance values by using a switch; and each resistance value corresponds to one current-limiting current of the current-limiting circuit. After a current-limiting current that needs to be output is determined, the detecting resistor may be adjusted to one resistance value that is among the at least one resistance value and corresponds to the current-limiting current needed to be output.

It should be noted that in the current-limiting circuit, the current-limiting current may be obtained by the formula: $W_{LIM-IN}-I_{LIM}*R_{LIM}=V_{LIM-IN}-R_{SNS}*I_{REF}$ when there is no measurement error, where $V_{LIM-IN}$ indicates an input voltage of the current-limiting circuit; $I_{LIM}$ indicates a current-limiting current; $R_{LIM}$ indicates a current-limiting resistance; $R_{SNS}$ indicates a detecting resistance; and $I_{REF}$ indicates a precise reference current. It can be known from the above formula that the current-limiting current $I_{LIM}=R_{SNS}*I_{REF}/R_{LIM}$. It can also be known from the above formula that precision of a final current-limiting current value $I_{LIM}$ depends on $I_{REF}$ precision and matching between $R_{LIM}$ and $R_{SNS}$. In a normal circumstance, a precise offset current is used as $I_{REF}$ in a circuit of a large PMU (Power Management Unit, power management unit); or when the $I_{REF}$ is generated by the circuit of the large PMU, it is relatively easy to obtain a relatively high-precision $I_{REF}$. Therefore, impact of $I_{REF}$ precision can be ignored, and the precision of the current-limiting current value $I_{LIM}$ mainly depends on the matching between the $R_{LIM}$ and the $R_{SNS}$. In the current-limiting circuit, the resistor that provides current-limiting resistance $R_{LIM}$ is connected between the input voltage end and a source electrode of the power MOS transistor. In order to ensure normal operating of the power MOS transistor, the value of the current-limiting resistance $R_{LIM}$ must not change. Therefore, a value of the detecting resistance $R_{SNS}$ can be adjusted, so as to enable the current-limiting circuit to output a plurality of current-limiting currents. That is, the detecting resistor is set with at least one resistance value, and each resistance value of the detecting resistor corresponds to each current-limiting current.

One end of the current-limiting resistor 202 is connected to the input voltage end 206, and the other end thereof is connected to the inverting input end of the OP 205.

Specifically, one end of the current-limiting resistor 202 is connected to the voltage input end 206, and one end of the detecting resistor 201 is also connected to the input voltage end 206; therefore, the current-limiting resistor 202 is connected in parallel with the detecting resistor 201.

Further, the current-limiting resistor 202 and the detecting resistor 201 are of a same type. For example, the detecting resistor is a resistor of Rpoly type; then, the current-limiting resistor is also a resistor of Rpoly type The precise current unit 203 is connected to the other end of the detecting resistor 201 and is configured to adjust a proportional error between the current-limiting resistor 202 and the detecting resistor 201 by outputting a precise reference current.

Specifically, the precise current unit 203 is capable of adjusting a proportional error in the current-limiting circuit by using a precise reference current. The precise current unit 203 is connected to the other end of the detecting resistor 201, that is, the precise current unit 203 is connected to the end of the detecting resistor 201 which is connected to the non-inverting input end of the OP 205. In this way, one end of the detecting resistor 201 is connected to the non-inverting input end of the OP 205 and also connected to the precise current unit 203. Therefore, the precise current unit 203 is connected in parallel with the non-inverting input end of the OP 205.

Further, a precise reference current may be a precise offset current generated in a PMU circuit or may be generated by the precise current unit, which is not limited by the present invention.

It should be noted that there are mainly two error sources in the current-limiting circuit. One error source is a proportional error between resistors in the current-limiting circuit, which is a proportional error between the current-limiting resistor and the detecting resistor and is called a first error. The first error may be adjusted by using the precise reference current. The other error source is an offset error of the operational amplifier OP and is called a second error. In this case, a formula for acquiring the current-limiting current is: $I_{LIM} = (I_{REF}*K)*(1+\Delta K)+V_{OS}/R_{LIM}$, where $I_{LIM}$ indicates a test current-limiting current; $(I_{REF}*K)$ indicates a set current-limiting current; $\Delta K$ indicates the first error; and $V_{OS}$ indicates the second error. By using the above formula, the second error can be expressed by the first error. Therefore, in the current-limiting circuit, the first error and the second error can be adjusted through a precise reference current, so as to obtain a high-precision current-limiting current.

The power MOS transistor 204 includes a gate electrode 2041, a source electrode 2042, and a drain electrode 2043. The gate electrode 2041 is connected to the output end of the OP 205. The source electrode 2042 is connected to the other end of the current-limiting resistor 202. The drain electrode 2043 outputs a current-limiting current corresponding to one resistance value.

Further, the source electrode 2042 of the power MOS transistor 204 is connected in parallel with the inverting input end of the OP 205.

Specifically, the source electrode 2042 of the power MOS transistor 204 is connected to the other end of the current-limiting resistor 202, that is, the source electrode 2042 of the power MOS transistor 204 is connected to one end of the current-limiting resistor 202 which is connected to the inverting input end of the OP 205. In this way, one end of the current-limiting resistor 202 is connected to the inverting input end of the OP 205 and also connected to the source electrode 2042 of the power MOS transistor 204. In other words, the inverting input end of the OP 205 is connected in parallel with the source electrode 2042 of the power MOS transistor.

Further, the output end of the OP 205 is connected to the gate electrode 2041 of the power MOS transistor 204, so that a negative feedback loop can be formed.

Exemplarily, the power MOS transistor includes a P-type MOS transistor.

The input voltage end 206 is configured to receive input voltage.

Specifically, when an external device is attached to the current-limiting circuit, voltage is received through the input voltage end 206, and therefore, other units of the whole current-limiting circuit are triggered to work. The input voltage end 206 is connected to one end of the detecting resistor 201 and one end of the current-limiting resistor 202, that is, the input voltage end 206, the detecting resistor 201 and the current-limiting resistor 202 are connected in a point.

The embodiments of the present invention provide a current-limiting circuit, where the current-limiting circuit includes a detecting resistor, a current-limiting resistor, a precise current unit, a power MOS transistor, an operational amplifier OP, and an input voltage end. In this way, no external resistor is added to facilitate the current-limiting circuit in the present invention, and corresponding high-precision current-limiting currents are generated by internal units of the circuit, thereby reducing costs of the current-limiting circuit and reducing occupied PCB board area. Further, when the current-limiting circuit is a current-limiting circuit with multiple current-limiting currents, different calibration positions of each current-limiting current can be uniformized by the current-limiting circuit, which means that all current-limiting currents require only one group of calibration positions. That is, in the current-limiting circuit, a proportional error in the current-limiting current may be calibrated by a precise reference current provided by a precise current unit to obtain a group of calibration positions; and by using the calibration positions, different currents in the current-limiting circuit can be calibrated, to enable the current-limiting circuit to generate a high-precision current-limiting current, thereby further reducing costs of the current-limiting circuit.

Figure 3:
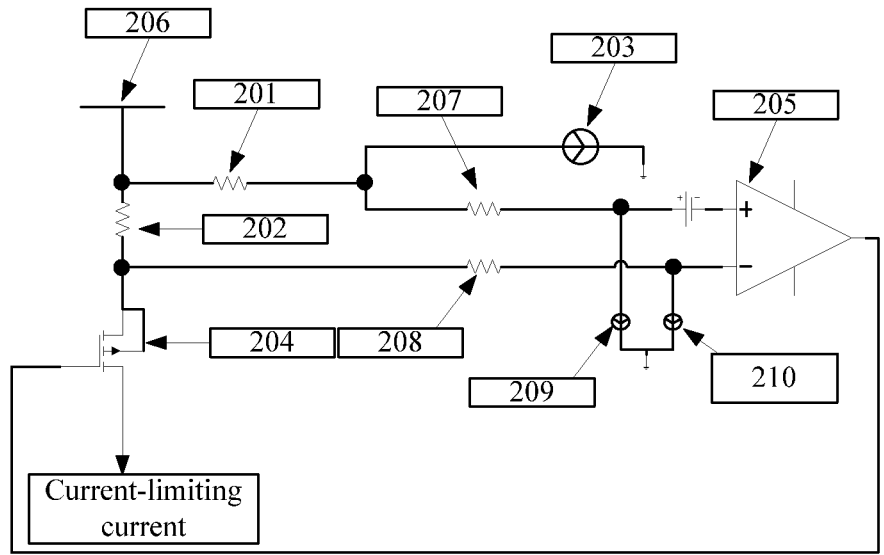
FIG. 3 is a schematic structural diagram of another current-limiting circuit according to an embodiment of the present invention.

Further, as shown in FIG. 3, the current-limiting circuit further includes a first resistor 207, a second resistor 208, a first current source 209, and a second current source 210.

The other end of the detecting resistor 201 is connected to the non-inverting input end of the OP 205 through the first resistor 207.

Specifically, one end of the first resistor 207 is connected to the other end of the detecting resistor 201, and the other end of the first resistor 207 is connected to the non-inverting input end of the OP 205.

The other end of the current-limiting resistor 202 is connected to the inverting input end of the OP 205 through the second resistor 208.

Specifically, one end of the second resistor 208 is connected to the other end of the current-limiting resistor 202, and the other end of the second resistor 208 is connected to the inverting input end of the OP 205.

Further, the first resistor 207 and the second resistor 208 are resistors of a same type.

Further, the first resistor 207, the second resistor 208, the detecting resistor 201, and the current-limiting resistor 202 are resistors of a same type, for example, resistors of Rploy type.

Further, resistance values of the first resistor 207 and the second resistor 208 are equal.

The first current source 209 is coupled between the first resistor 207 and the non-inverting input end of the OP 205 and is configured to calibrate an offset voltage of the OP 205 when the offset voltage between a voltage of the non-inverting input end of the OP and a voltage of the inverting input end of the OP is greater than 0.

Specifically, the current-limiting circuit includes the OP 205, and therefore, when an offset voltage greater than 0 exists between the non-inverting input end and the inverting input end of the OP 205, that is, when an offset voltage is generated because a voltage of the non-inverting input end is greater than a voltage of the inverting input end of the OP 205, the offset voltage needs to be calibrated so as to accurately output a required current-limiting current. In this case, the first current source 209 is connected to one end of the first resistor 207 which is connected to the non-inverting input end of the OP 205, that is, the first current source 209 is connected in parallel with the non-inverting input end of the OP 205.

The second current source 210 is coupled between the second resistor and the inverting input end of the OP and is configured to calibrate the offset voltage of the OP 205 when the offset voltage between a voltage of the non-inverting input end of the OP and a voltage of the inverting input end of the OP is less than 0.

Specifically, in order to calibrate an offset voltage of less than 0 between the non-inverting input end and the inverting input end of the OP 205, that is, in order to calibrate an offset voltage that is generated when a voltage of the inverting input of the OP 205 is greater than a voltage of the non-inverting input end of the OP 205, the second current source 210 is connected to one end of the second resistor 208 which is connected to the inverting input end of the OP 205. That is, the second current source 210 is connected in parallel with the inverting input end of the OP 205.

Further, an initial value of a current input by the first current source 209 to the first resistor 207 is 0 milliampere, and an initial value of a current input by the second current source 210 to the second resistor 208 is 0 milliampere. Apparently, the initial value of the current input by the first current source 209 to the first resistor 207 may not be 0 milliampere, and the initial value of the current input by the second current source 210 to the second resistor 208 may not be 0 milliampere, and if so, the current input by the first current source 209 to the first resistor 207 is equal to the current input by the second current source 210 to the second resistor 208.

It should be noted that the second error in the current-limiting circuit may be adjusted by the first current source and the second current source. In this case, it is not necessary to express the second error by using the first error. Apparently, the first error may also be expressed by the second error and further adjusted by the first current source and the second current source.

This embodiment of the present invention provides a current-limiting circuit, where the current-limiting circuit includes a detecting resistor, a current-limiting resistor, a precise current unit, a power MOS transistor, an operational amplifier OP, and an input voltage end. In this way, no external resistor is added to facilitate the current-limiting circuit in the present invention, and corresponding high-precision current-limiting currents are generated by internal units of the circuit, thereby reducing costs of the current-limiting circuit and reducing occupied PCB board area. Further, when the current-limiting circuit is a current-limiting circuit with multiple current-limiting currents, different calibration positions of each current-limiting current can be uniformized through the current-limiting circuit, which means that all current-limiting currents require only one group of calibration positions. That is, in the current-limiting circuit, a proportional error in the current-limiting current can be calibrated and adjusted by using a precise reference current provided by the precise current unit, and an offset voltage in the current-limiting circuit can be calibrated and adjusted by a first current source and a second current source, so as to obtain a group of calibration positions. By using the calibration positions, different currents in the current-limiting circuit may be calibrated, to enable the current-limiting circuit to generate a high-precision current-limiting circuit, thereby further reducing costs of the current-limiting circuit.

Figure 4:
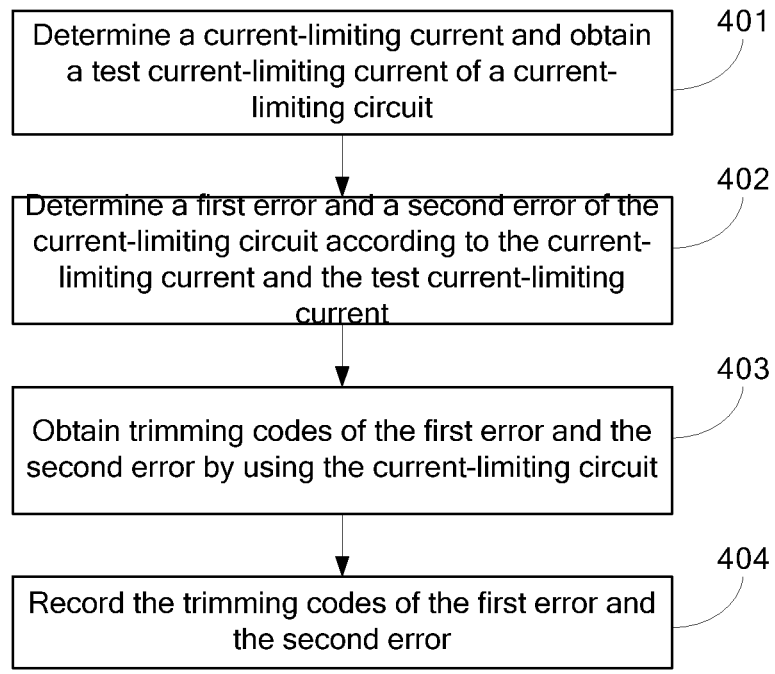
FIG. 4 is a schematic diagram of a method for calibrating and limiting a current according to an embodiment of the present invention.

An embodiment of the present invention provides a method for calibrating and limiting a current. It should be noted that the method is not a method in true sense, and the method only describes a process of debugging a current-limiting circuit provided by this embodiment, and a generated trimming code is used to adjust a precise reference current. As shown in FIG. 4, the method for calibrating and limiting a current includes:

401. Determine a current-limiting current and obtain a test current-limiting current of a current-limiting circuit.

The current-limiting circuit is configured to obtain a current-limiting current and includes: a detecting resistor, a current-limiting resistor, a precise current unit, a power MOS transistor, an operational amplifier OP, and an input voltage end. Specifically, in the current-limiting circuit, there are two error sources: a first error and a second error. The first error is a proportional error between the current-limiting resistor and the detecting resistor. The second error is an offset error of the OP in the current-limiting circuit. In this case, a formula for obtaining a current-limiting current may be: $I_{LIM}=(I_{REF}*K)*(1+\Delta K)+V_{OS}/R_{LIM}$, where $I_{LIM}$ indicates a test current-limiting current; $(I_{REF}*K)$ indicates a set current-limiting current; $\Delta K$ indicates the first error; and $V_{OS}$ indicates the second error.

$I_{REF}*K$ can be determined after a current value of the current-limiting circuit is set. The current-limiting circuit is electrified, that is, an input voltage is applied, so that the test current-limiting current is input to the current-limiting circuit.

402. Determine the first error and the second error of the current-limiting circuit according to the current-limiting current and the test current-limiting current.

Specifically, the first error and the second error of the current-limiting circuit may be determined according to the formula: $I_{LIM}=(I_{REF}*K)*(1+\Delta K)+V_{OS}/R_{LIM}$.

Exemplarily, the current-limiting circuit is set to 200-milliampere and the next time to 300-milliampere, and the test current-limiting current is obtained, which is recorded as $I_{200}$ and $I_{300}$ respectively. According to a formula $I_{200}=200*(1+\Delta K)+V_{OS}/R_{LIM}$ and a formula $I_{300}=300(1+\Delta K)+V_{OS}/R_{LIM}$, it may be determined that the first error is $1+\Delta K=(I_{300}-I_{200})/100$, and the second error is $V_{OS}/R_{LIM}=I_{200}-200*(I_{300}-I_{200})/100=I_{200}-2(I_{300}-I_{200})=3I_{200}-2I_{300}$.

403. Obtain trimming codes of the first error and the second error through the current-limiting circuit.

The first error may be adjusted by using the precise reference current in the current-limiting circuit, so the trimming codes of the first error and the second error may be obtained by using the precise reference current in the precise current unit of the current-limiting circuit.

Specifically, because the precise reference current in the current-limiting circuit can adjust only the first error, when the second error is adjusted, the second error may be converted to the first error. In this case, the specific adjusting steps are as follows: Convert the second error into a corresponding first error; in a case that the offset voltage between the non-inverting input end and the inverting input end of the OP is greater than 0, determine the trimming code of the first error and the trimming code of the second error according to the number of precise reference current branches and the first error; in a case that the offset voltage between the non-inverting input end and the inverting input end of the OP is less than 0, determine the trimming code of the second error according to the number of precise reference current branches and the first error; and determine the trimming code of the first error according to the number of precise reference current branches, the first error, and the trimming code of the second error.

Further, the determining the trimming code of the first error according to the number of precise reference current branches and the first error includes:

determining the trimming code of the first error according to a formula: $N_{RES}=\Delta K/(I_1/N*I_1)$, where $N_{RES}$ indicates the trimming code of the first error; $\Delta K$ indicates the first error; $I_1$ indicates a current in each branch of the precise reference current; and N indicates the number of precise reference current branches.

The determining the trimming code of the first error according to the number of precise reference current branches, the first error, and the trimming code of the second error includes:

determining the trimming code of the first error according to a formula: $N_{RES}=\Delta K/(I_1/N*I_1)-N_{VOS}$, where $N_{VOS}$ indicates the trimming code of the second error.

Specifically, after the second error is converted into the corresponding first error, the offset voltage between the non-inverting input end and the inverting input end of the OP can be determined In a case that the offset voltage is greater than 0, a step value required for adjusting the first error may be obtained according to a formula: $N_{RES}=\Delta K/1*100\%/N$. The obtained step value is the trimming code of the first error, and the trimming code of the second error may be obtained.

In a case that the offset voltage between the non-inverting input end and the inverting input end of the OP is less than 0, a current of the non-inverting input end of the OP needs to be adjusted when the second error is adjusted. When the current of the non-inverting input end of the OP is adjusted, there is impact on a current flowing through the detecting resistor $R_{SNS}$. To eliminate the impact the trimming code of the first error is further calculated to be $N_{RES}=\Delta K/(I_1/N*I_1)-N_{VOS}$ after the trimming code of the second error is obtained.

Further, the current-limiting circuit may further include a first resistor, a second resistor, a first current source, and a second current source. The second error may be adjusted by the first current source and the second current source. Therefore, the obtaining trimming codes of the first error and the second error by using the current-limiting circuit may include: obtaining the trimming codes of the first error and the second error by using the first resistor, the second resistor, the first current source, and the second current source of the current-limiting circuit.

Specifically, because only the second error can be adjusted by the first current source and the second current source in the current-limiting circuit, the first error may be converted to the second error when the first error is adjusted. In this case, the specific adjusting steps are as follows: Convert the first error to a corresponding second error; when an offset voltage between the non-inverting input end and the inverting input end of the OP is greater than 0, enable a current of the second current source to flow through the second resistor to generate a second voltage, and determine the trimming code of the second error and the trimming code of the first error according to the second error and the second voltage; when an offset voltage between the non-inverting input end and the inverting input end of the OP is less than 0, enable a current of the first current source to flow through the first resistor to generate a first voltage, determine the trimming code of the second error according to the second error and the first voltage, and determine the trimming code of the first error according to the second error, the first voltage, and the trimming code of the second error.

Further, the determining the trimming code of the second error according to the second error and the second voltage includes: determining the trimming code of the second error according to a formula: $N_{VOS}=V_{OS}/(I_3*r_3)$, where $N_{VOS}$ indicates the trimming code of the second error; $V_{OS}$ indicates the second error; $I_3$ indicates the current of the second current source; $r_3$ indicates the second resistor; and $I_3*r_3$ indicates the second voltage.

The determining the trimming code of the second error according to the second error and the first voltage includes: determining the trimming code of the second error according to a formula: $N_{VOS}=V_{OS}/(I_2*r_2)$, where $I_2$ indicates the current of the first current source; $r_2$ indicates the first resistor; and $I_2*r_2$ indicates the first voltage.

The determining the trimming code of the first error according to the second error, the first voltage and the trimming code of the second error includes: determining the trimming code of the first error according to a formula: $N_{RES}=V_{OS}/(I_2*r_2)-N_{VOS}$, where $N_{RES}$ indicates the trimming code of the first error.

It should be noted that, in the foregoing method, a current adjusted each time is provided by the first current source or the second current source.

Further, in a case that the current-limiting circuit may further include the first resistor, the second resistor, the first current source, and the second current source, the obtaining trimming codes of the first error and the second error by using the current-limiting circuit may further include: obtaining the trimming codes of the first error and the second error by using the first resistor, the second resistor, the first current source, the second current source, and the precise reference current in the precise current unit of the current-limiting circuit.

Specifically, in a case that the current-limiting circuit may further include the first resistor, the second resistor, the first current source, and the second current source, the first error is adjusted, by using the precise reference current in the precise current unit of the current-limiting circuit, to obtain the trimming code of the first error; and the second error is adjusted by the first current source and the second current source of the current-limiting circuit, to obtain the trimming code of the second error.

The specific steps of obtaining the trimming codes of the first error and the second error are: in a case that the non-inverting voltage of the OP is greater than the inverting voltage, determining the trimming code of the first error according to the number of precise reference current branches and the first error; enabling a current of the second current source to flow through the second resistor to generate a second voltage; and determining the trimming code of the second error according to the second error and the second voltage.

Further, the determining the trimming code of the first error according to the number of precise reference current branches and the first error may be: determining the trimming code of the first error according to a formula: $N_{RES}=\Delta K/(I_1/N*I_1)$. The determining the trimming code of the second error according to the second error and the second voltage may be: determining the trimming code of the second error according to a formula: $N_{VOS}=V_{OS}/(I_3*r_3)$.

In a case that an offset voltage between the non-inverting input end and the inverting input end of the OP is less than 0, a current of the first current source flows through the first resistor to generate a first voltage; the trimming code of the second error is determined according to the first error and the first voltage; and the trimming code of the first error is determined according to the number of precise reference current branches, the first error, and the trimming code of the second error.

Further, the determining the trimming code of the second error according to the first error and the first voltage includes: determining the trimming code of the second error according to a formula: $N_{VOS}=V_{OS}/(I_2*r_2)$. The determining the trimming code of the first error according to the number of precise reference current branches, the first error, and the trimming code of the second error includes: determining the trimming code of the first error according to a formula: $N_{RES}=\Delta K/(I_1/N*I_1)-N_{VOS}$.

It should be noted that in this embodiment of the present invention, the resistance value of the first resistor, the resistance value of the second resistor, the current of the first current source, the current of the second current source, and the precise reference current may be determined according to precision of an actually required current-limiting current, which is not limited by the present invention.

Exemplarily, the resistance value for each of the first resistor and the second resistor is 800 ohm; a current $I_1$ in each branch of the precise reference current is 0.5 micro-ampere; the precise reference current has a total of 40 branches; the current $I_2$ of the first current source is 0.5 micro-ampere; and the current $I_3$ of the second current source is 0.5 micro-ampere. When the non-inverting input end voltage of the OP is greater than the inverting input end voltage, the trimming code of the first error is: $N_{RES}=\Delta K/(I_1/N*I_1)=\Delta K/(0.5$ micro-ampere/40*0.5 micro-ampere)$=\Delta K/2.5\%$, and the trimming code of the second error is: $N_{VOS}=V_{OS}/(I_3*r_3)=V_{OS}/(0.5$ micro-ampere*800 ohm)$=V_{OS}/400$ micro-volt$=V_{OS}/0.4$ millivolt. When the inverting input end voltage of the OP is less than the non-inverting input end voltage, that is, when the offset voltage between the non-inverting input end and the inverting input end of the OP is greater than 0, the trimming code of the second error is: $N_{VOS}=V_{OS}/(I_2*r_2)=V_{OS}/(0.5$ micro-ampere*800 ohm)$=V_{OS}/400$ micro-volt$=V_{OS}/0.4$ millivolt, and the trimming code of the first error is: $N_{RES}=\Delta K/(I_1/N*I_1)-N_{VOS}=\Delta K/(0.5$ micro-ampere/40*0.5 micro-ampere)$-N_{VOS}=\Delta K/2.5\%-N_{VOS}$.

404. Record the trimming codes of the first error and the second error.

The trimming codes of the first error and the second error may be burnt to corresponding calibration positions.

Specifically, the trimming code of the first error and the trimming code of the second error that are obtained are burnt to the corresponding calibration positions, to write information of the trimming code of the first error and the trimming code of the second error. After the burning is completed, current-limiting thresholds of all current-limiting currents are tested again. If the test results are in a specified range, the trimming is successful, and the precise reference current can achieve precise adjustment of the proportional error.

This embodiment of the present invention provides a method for calibrating and limiting a current, which includes: obtaining a corresponding test current-limiting current, by using a current-limiting circuit, after a current-limiting current is determined, where the current-limiting circuit includes a detecting resistor, a current-limiting resistor, a precise current unit, a power MOS transistor, an OP, and an input voltage end; determining a first error and a second error according to the determined current-limiting current and the obtained test current-limiting current; and obtaining a trimming code of the first code and a trimming code of the second error by using a precise reference current in the precise current unit and/or a first current source and a second current source in the current-limiting current, and recording the trimming codes. In this way, no external resistor is added to facilitate the current-limiting circuit in the present invention, and corresponding high-precision current-limiting currents are generated by internal units of the circuit, thereby reducing costs of the current-limiting circuit and reducing occupied PCB board area. Further, when the current-limiting circuit is a current-limiting circuit with multiple current-limiting currents, different calibration positions of each current-limiting current can be uniformized through the current-limiting circuit, which means that all current-limiting currents require only one group of calibration positions. That is, in the current-limiting circuit, a proportional error in the current-limiting current may be calibrated and adjusted by using the precise reference current provided by the precise current unit; an offset voltage in the current-limiting circuit is calibrated and adjusted by the first current source and the second current source, so as to obtain a group of calibration positions; and by using the calibration positions, different currents in the current-limiting circuit may be calibrated, to enable the current-limiting circuit to generate a high-precision current-limiting circuit, thereby further reducing costs of the current-limiting circuit.

Figure 5:
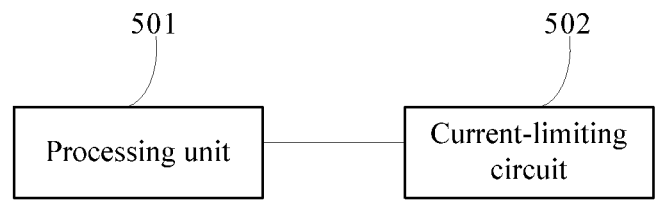
FIG. 5 is a schematic structural diagram of a current-limiting apparatus according to an embodiment of the present invention.

An embodiment of the present invention provides a current-limiting apparatus. As shown in FIG. 5, the current-limiting device includes a processing unit 501 and a current-limiting circuit 502.

The processing unit 501 is configured to adjust a resistance value of the detecting resistor to one resistance value among the at least one resistance value.

Specifically, after a current-limiting current that needs to be output by the current-limiting apparatus is determined, the processing unit 501 may adjust the resistance value of the detecting resistor in the current-limiting circuit 502 to one resistance value corresponding to the current-limiting current that needs to be output.

The current-limiting circuit 502 is the current-limiting circuit described in the foregoing embodiments.

The embodiments of the present invention provide a current-limiting circuit and apparatus, and a method for calibrating and limiting a current, where the current-limiting circuit includes a detecting resistor, a current-limiting resistor, a precise current unit, a power MOS transistor, an operational amplifier OP, and an input voltage end. In this way, no external resistor is added to facilitate the current-limiting circuit in the present invention, and corresponding high-precision current-limiting currents are generated by internal units of the circuit, thereby reducing costs of the current-limiting circuit and reducing occupied PCB board area. Further, when the current-limiting circuit is a current-limiting circuit with multiple current-limiting currents, different calibration positions of each current-limiting current can be uniformized through the current-limiting circuit, which means that all current-limiting currents require only one group of calibration positions. That is, in the current-limiting circuit, a proportional error in the current-limiting current may be calibrated and adjusted by using a precise reference current provided by the precise current unit; an offset voltage in the current-limiting circuit is calibrated and adjusted by a first current source and a second current source, so as to obtain a group of calibration positions; and by using the calibration positions, different currents in the current-limiting circuit may be calibrated, to enable the current-limiting circuit to generate a high-precision current-limiting circuit, thereby further reducing costs of the current-limiting circuit.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A current-limiting circuit, comprising a detecting resistor, a current-limiting resistor, a precise current unit, a power metal oxide semiconductor MOS transistor, an operational amplifier OP and an input voltage end, wherein the OP comprises a non-inverting input end, an inverting input end and an output end;
   the input voltage end is configured to receive an input voltage;
   one end of the detecting resistor is connected to the input voltage end, and the other end of the detecting resistor is connected to the non-inverting input end of the OP, and the detecting resistor is provided with at least one resistance value, and a resistance value of the detecting resistor may be adjusted to one resistance value among the at least one resistance value;
   one end of the current-limiting resistor is connected to the input voltage end, and the other end of the current-limiting resistor is connected to the inverting input end of the OP;
   the precise current unit is connected to the other end of the detecting resistor and is configured to adjust a proportional error between the current-limiting resistor and the detecting resistor by outputting a precise reference current; and
   the power MOS transistor comprises a gate electrode, a source electrode and a drain electrode, wherein the gate electrode is connected to the output end of the OP, the source electrode is connected to the other end of the current-limiting resistor, and the drain electrode outputs a current-limiting current corresponding to one resistance value.

2. The circuit according to claim 1, wherein the detecting resistor and the current-limiting resistor are of a same type.

3. The circuit according to claim 1, further comprising a first resistor, a second resistor, a first current source and a second current source, wherein:
   the other end of the detecting resistor is connected to the non-inverting input end of the OP through the first resistor;
   the other end of the current-limiting resistor is connected to the inverting input end of the OP through the second resistor;
   the first current source is coupled between the first resistor and the non-inverting input end of the OP and is configured to calibrate an offset voltage of the OP when the offset voltage between a voltage of the non-inverting input end of the OP and a voltage of the inverting input end of the OP is greater than 0; and
   the second current source is coupled between the second resistor and the inverting input end of the OP and is configured to calibrate the offset voltage of the OP when the offset voltage between the voltage of the non-inverting input end of the OP and the voltage of the inverting input end of the OP is less than 0.

4. The circuit according to claim 3, wherein the first resistor and the second resistor are resistors of a same type.

5. The circuit according to claim 3, wherein:
   resistance values of the first resistor and the second resistor are equal.

6. The circuit according to claim 3, wherein an initial value of a current input by the first current source to the first resistor is 0 milliampere, and an initial value of a current input by the second current source to the second resistor is 0 milliampere.

7. The circuit according to claim 3, wherein:
   an initial value of a current input by the first current source to the first resistor is not 0 milliampere, an initial value of a current input by the second current source to the second resistor is not 0 milliampere, and the current input by the first current source to the first resistor is equal to the current input by the second current source to the second resistor.

8. The circuit according to claim 3, wherein the first resistor, the second resistor, the detecting resistor and the current-limiting resistor are resistors of a same type.

9. The circuit according to claim 1, wherein:
   the power MOS transistor comprises a P-type power MOS transistor.

10. A current-limiting apparatus, comprising a processing unit and a current-limiting circuit, wherein:
    the processing unit is configured to adjust a resistance value of the detecting resistor to one resistance value among the at least one resistance value;
    the current-limiting circuit comprising a detecting resistor, a current-limiting resistor, a precise current unit, a power metal oxide semiconductor MOS transistor, an operational amplifier OP and an input voltage end, wherein the OP comprises a non-inverting input end, an inverting input end and an output end;
    the input voltage end is configured to receive an input voltage;
    one end of the detecting resistor is connected to the input voltage end, and the other end of the detecting resistor is connected to the non-inverting input end of the OP, and the detecting resistor is provided with at least one resistance value, and a resistance value of the detecting resistor may be adjusted to one resistance value among the at least one resistance value;
    one end of the current-limiting resistor is connected to the input voltage end, and the other end of the current-limiting resistor is connected to the inverting input end of the OP;
    the precise current unit is connected to the other end of the detecting resistor and is configured to adjust a proportional error between the current-limiting resistor and the detecting resistor by outputting a precise reference current; and
    the power MOS transistor comprises a gate electrode, a source electrode and a drain electrode, wherein the gate electrode is connected to the output end of the OP, the source electrode is connected to the other end of the current-limiting resistor, and the drain electrode outputs a current-limiting current corresponding to one resistance value.

11. The apparatus according to claim 10, wherein the detecting resistor and the current-limiting resistor are of a same type.

12. The apparatus according to claim 10, further comprising a first resistor, a second resistor, a first current source and a second current source, wherein:

the other end of the detecting resistor is connected to the non-inverting input end of the OP through the first resistor;

the other end of the current-limiting resistor is connected to the inverting input end of the OP through the second resistor;

the first current source is coupled between the first resistor and the non-inverting input end of the OP and is configured to calibrate an offset voltage of the OP when the offset voltage between a voltage of the non-inverting input end of the OP and a voltage of the inverting input end of the OP is greater than 0; and the second current source is coupled between the second resistor and the inverting input end of the OP and is configured to calibrate the offset voltage of the OP when the offset voltage between the voltage of the non-inverting input end of the OP and the voltage of the inverting input end of the OP is less than 0.

13. The apparatus according to claim 12, wherein the first resistor and the second resistor are resistors of a same type.

14. The apparatus according to claim 12, wherein:
resistance values of the first resistor and the second resistor are equal.

15. The apparatus according to claim 12, wherein an initial value of a current input by the first current source to the first resistor is 0 milliampere, and an initial value of a current input by the second current source to the second resistor is 0 milliampere.

16. The apparatus according to claim 12, wherein:
an initial value of a current input by the first current source to the first resistor is not 0 milliampere, an initial value of a current input by the second current source to the second resistor is not 0 milliampere, and the current input by the first current source to the first resistor is equal to the current input by the second current source to the second resistor.

17. The apparatus according to claim 12, wherein the first resistor, the second resistor, the detecting resistor and the current-limiting resistor are resistors of a same type.

18. The apparatus according to claim 10, wherein:
the power MOS transistor comprises a P-type power MOS transistor.

* * * * *